United States Patent [19]

Ikeda et al.

[11] 4,216,247

[45] Aug. 5, 1980

[54] METHOD OF MANUFACTURING POSITIVE ELECTRODE FOR NONAQUEOUS CELL

[75] Inventors: Hironosuke Ikeda, Hirakata; Mitsunori Hara; Satoshi Narukawa, both of Kobe; Hiroji Maeda, Sumoto, all of Japan

[73] Assignee: Sanyo Electric Co., Ltd., Moriguchi, Japan

[21] Appl. No.: 940,095

[22] Filed: Sep. 6, 1978

[30] Foreign Application Priority Data

Sep. 20, 1977 [JP] Japan .................. 52/114072

[51] Int. Cl.$^2$ .................. B05D 5/12; B05D 3/02; B05D 3/12
[52] U.S. Cl. .................. 427/115; 427/126.3; 427/350; 427/377; 427/226; 429/224
[58] Field of Search .............. 427/115, 126, 350, 377, 427/226; 429/224

[56] References Cited

U.S. PATENT DOCUMENTS

| | | | |
|---|---|---|---|
| 3,925,100 | 12/1975 | Buzzelli | 429/224 |
| 3,939,010 | 2/1976 | Coleman | 429/224 |
| 4,091,178 | 5/1978 | Kordesch | 429/224 |
| 4,096,318 | 6/1978 | Wurmb | 429/224 |
| 4,133,856 | 1/1979 | Ikeda | 429/224 |

OTHER PUBLICATIONS

"MnO$_2$ Symposium", Ikeda et al., *MnO$_2$ as Cathode for Lithium Batteries* p. 384-401 (1975).

*Primary Examiner*—Michael F. Esposito
*Attorney, Agent, or Firm*—Armstrong, Nikaido, Marmelstein & Kubovcik

[57] ABSTRACT

The present invention discloses a method of manufacturing positive electrodes for nonaqueous cells in which manganese dioxide is used as positive active material and light metals such as lithium, sodium or aluminium are used as negative active material, said method comprising the steps of adding to manganese dioxide active material powder, a binder and a viscous agent solution decomposable at temperatures lower than the melting point of the binder, thereby to form paste, applying such paste to the supporting member, and heat-treating this paste-applied supporting member firstly at the decomposition temperature of the viscous agent in an oxidization atmosphere, and secondly at the melting point of the binder under vacuum or in an inert atmosphere, whereby a decrease in the discharge capacity during the manufacture is restrained, to improve the cell performance.

4 Claims, 1 Drawing Figure

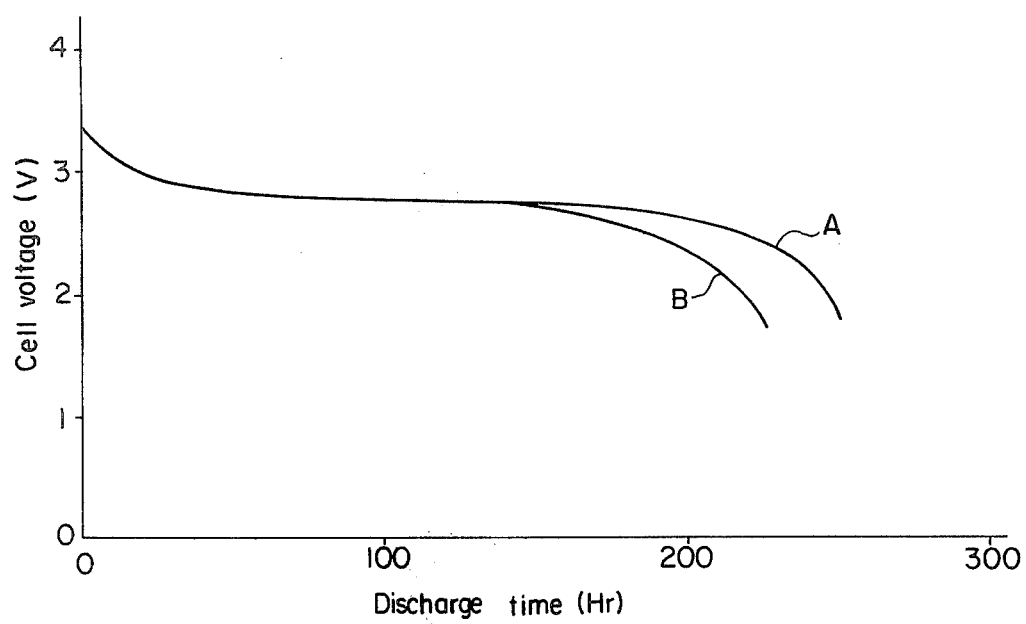

METHOD OF MANUFACTURING POSITIVE
ELECTRODE FOR NONAQUEOUS CELL

BACKGROUND OF THE INVENTION

In manufacturing positive electrodes for cells in which manganese dioxide is used as an active material, a paste-type method may be considered for obtaining a thin positive electrode having high-rate discharge characteristics. In this case, it may be proposed to add to manganese dioxide active material powder, a viscous agent solution also serving as a binder such as polyvinyl alcohol or methyl cellulose, thereby to form paste, which is subsequently applied to or coated on the supporting member, and to heat-treat such paste-applied or paste-coated supporting member at temperatures lower than the decomposition temperature of the viscous agent. This method is inconvenient, particularly in the case of the positive electrodes for nonaqueous cells because positive electrodes used for nonaqueous cells should be activated with substantially all water removed. However, at temperatures around 200° C. combined water may not be removed from the manganese dioxide, although adherent water may be removed. In order to remove the combined water, it is therefore necessary to perform heat-treatment at temperatures higher than 250° C., preferably in the range from 350° C. to 430° C.

Alternatively, it is possible to prepare starting active material of manganese dioxide from which adherent water and combined water have been removed as far as possible by previously heat-treating the manganese dioxide at temperatures in the range from 350° C. to 430° C. In this case, however, when such manganese dioxide is mixed with a conductive agent and a viscous agent during the manufacture, water is again adhered to the manganese dioxide. For removing such re-adhered water, it is required to perform heat-treatment at temperatures higher than 200° C., preferably at a temperature of approximately 300° C. However, when a viscous agent decomposable at a temperature of about 200° to 280° C. such a polyvinyl alcohol or methyl cellulose alone is also used as a binder, it is not possible to perform heat-treatment at temperatures higher than the decomposition temperature of such a viscous agent.

Accordingly, the thus described method of using only a viscous agent serving also as a binder is not acceptable as a method of manufacturing the positive electrodes for nonaqueous cells.

In order to overcome the inconveniences above-mentioned, it may be proposed to use, in addition to a viscous agent used for forming paste, fluoric resin, nylon or the like having a melting point (about 300° C.) higher than the decomposition temperature of the viscous agent. However, it has been found that the performance of a cell manufactured according to this method depends on the atmosphere in which the heat-treatment was carried out. Namely, when a viscous agent and a binder are added to manganese dioxide active material powder and heat-treatment is subsequently performed at a temperature of about 300° C. under vacuum or in an inert atmosphere, the viscous agent is decomposed at a temperature in the vicinity of 200° C. This decomposition is an oxygen consuming reaction, in which the manganese dioxide is reduced, thereby to decrease the amount of effective manganese dioxide, thus resulting in a decrease in the discharge capacity.

SUMMARY OF THE INVENTION

In a method of manufacturing positive electrodes for nonaqueous cells in which manganese dioxide is used as positive active material and light metals such as lithium, sodium or aluminium are used as negative active material, the present invention provides restraint of a decrease in the discharge capacity during the manufacture, thereby to improve the cell performance.

BRIEF DESCRIPTION OF THE DRAWING

The accompanying drawing illustrates a comparison of discharge characteristics between a cell in which a positive electrode manufactured in accordance with the present invention (A) is used, and a cell in which a positive electrode made for the comparison is used (B).

DETAILED DESCRIPTION OF THE PREFERRED EMBODIMENT

The present invention relates to a method of manufacturing positive electrodes for nonaqueous cells in which manganese dioxide is used as positive active material and light metals such as lithium, sodium or aluminium are used as negative active material, while an organic solvent such as propylene carbonate or γ-butyrolactone in which a solute such as lithium perchlorate or lithium fluoborate is dissolved, is used as an electrolyte. According to the present invention, manganese dioxide active material powder is admixed with a binder having a high melting point such as fluoric resin or nylon, and a viscous agent solution decomposable at temperatures lower than the melting point of the binder such as polyvinyl alcohol or methyl cellulose, thereby to form paste, which is subsequently coated on the supporting member, and resulting paste-coated supporting member is then heat-treated firstly at the decomposition temperature of the viscous agent in an oxidization atmosphere and secondly at the melting point of the binder under vacuum or in an inert atmosphere.

The description hereinbelow will discuss in detail examples in which the present invention is embodied.

EXAMPLE 1

Manganese dioxide powder which has been prepared by heat-treating commercially available electrolytic manganese dioxide at temperature within the range from 350° C. to 430° C., as active material, and acetylene black as a conductive agent, and tetrafluoroethylene-hexafluoropropylene copolymer powder (melting point of about 290° C.) as a binder were mixed at a ratio of 90:8:2 to form a mixture.

2% by weight of a 10% polyvinyl alcohol solution which had been prepared by dissolving polyvinyl alcohol powder (decomposition temperature of about 200° C.) in water, was added to the previously prepared mixture and then mixingly kneaded to form paste. Such paste was applied to a supporting member made of stainless net. The resulting paste-coated supporting member was then heat-treated, firstly at 200° C. for 30 minutes in an oxidization atmosphere (in the air), and secondly at 300° C. for 90 minutes under vacuum, thus producing a positive electrode.

EXAMPLE 2

Manganese dioxide powder in Example 1 as active material, acetylene black as a conductive agent, and polytetrafluoroethylene resin powder (melting point of about 327° C.) as a binder were mixed at a ratio of 90:8:2, to form a mixture.

2% by weight of a 5% methyl cellulose solution which had been prepared by dissolving methyl cellulose powder (decomposition temperature of about 280° C.) in water, was added to the previously prepared mixture, and then mixingly kneaded to form paste. Such paste was applied to an supporting member made of stainless net. The resulting paste-coated supporting member was then heat-treated firstly at 280° C. for 30 minutes in an oxidization atmosphere, and secondly at 330° C. for 90 minutes under vacuum, thus producing a positive electrode.

EXAMPLE 3

Manganese dioxide powder in Example 1 as active material, acetylene black as a conductive agent, and nylon powder (melting point of about 270° C.) as a binder were mixed at a ratio of 88:8:4 to form a mixture.

2% by weight of a 10% polyvinyl alcohol solution in Example 1 was mixed to the previously prepared mixture and then mixingly kneaded to form paste. Such paste was applied to a supporting member made of stainless net. The resulting paste-applied supporting member was then heat-treated, firstly at 200° C. for 30 minutes in an oxidization atmosphere, and secondly at 270° C. for 180 minutes under vacuum, thus producing a positive electrode.

In this Example 3, the melting point of nylon powder used as a binder is relatively lower than those of binders used in Examples 1 and 2. It is therefore preferred to apply this Example 3 to the case in which manganese dioxide as starting material has previously been heated at temperatures in the range from 350° C. to 430° C.

Two heat-treatment steps used in the manufacturing method in accordance with the present invention provide the following effects.

In the first heat-treatment step in which heat-treatment is performed at the decomposition temperature of a viscous agent in an oxidization atmosphere, it is possible to restrain a decrease in the amount of effective manganese dioxide and to dehydrate the water contained in the viscous agent because the viscous agent is decomposed in an oxidization atmosphere.

In the second heat-treatment step, heat-treatment is performed at the melting point (high temperature) of a binder under vacuum or in an inert atmosphere, thereby to sufficiently remove the water present in the electrode. There is a tendency that in an oxidization atmosphere or in the air, decomposition of the binder is accelerated, which may exert a bad influence upon the manganese dioxide active material. Such problem is avoided because the second heat-treatment is performed under vacuum or in an inert atmosphere.

The description hereinafter will discuss a cell in which a positive electrode according to the present invention is used.

A cell was formed by a positive electrode of about 10.5 mm diameter and about 2 mm thickness stamped out from the positive electrode obtianed in Example 1, and a negative electrode of about 8 mm diameter stamped out from a lithium plate which had been rolled in a predetermined thickness in an atmosphere of argon in a dry box. As an electrolyte, propylene carbonate in which lithium perchlorate was being dissolved was used, while as a separator a nonwoven fabric of polypropylene was used. The cell dimension is of about 11.6 mm outer diameter and about 5.4 mm height.

For comparison with the present invention, a positive electrode was separatedly manufactured by heat-treating a paste-applied supporitng member at 300° C. for 90 minutes under vacuum immediately after applying said paste thereto without subjecting to the heat-treatment in an oxidization atmosphere.

Comparison of discharge characteristic with a load of 5.6 K$\Omega$ was made between a cell A in which a positive electrode according to the present invention is used, and a cell B using the positive electrode that was prepared for comparison, as shown in the accompanying drawing.

As apparent from the drawing, the discharge capacity of cell A (made with a positive electrode of the instant invention) is about 20% greater than that of cell B (made with the above-mentioned positive electrode that was prepared for comparison).

Concerning a binder and a viscous agent, following ones may be used in the present invention.

A binder includes fluoric resin such as tetrafluoroethylene-hexafluoropropylene copolymer, polytetrafluoroethylene resin, or tetrafluoroethylene-ethylene copolymer, and nylon having a melting point in the vicinity of 300° C.

A viscous agent includes polyvinyl alcohol and methyl cellulose.

As thus described, according to the present invention of manufacturing positive electrodes for nonaqueous cells, manganese dioxide active material powder is added with a binder and a viscous agent solution decomposable at temperatures lower than the melting point of the binder, thereby to form paste, which is subsequently applied to a supporting member, and such paste-applied supporting member is then heat-treated, firstly at the decomposition temperature of the viscous agent in an oxidization atmosphere, and secondly at the melting point of the binder under vacuum or in an inert atmosphere, thereby to restrain a decrease in the amount of effective manganese dioxide due to oxygen consumption reaction at the time of decomposition of the viscous agent, thus providing improvements in the cell performance.

What is claimed is:

1. A method of manufacturing positive electrodes for nonaqueous cells, comprising the steps of,
    adding to manganese dioxide active material powder, a binder and a viscous agent solution decomposable at temperatures lower than the melting point of said binder, thereby to form paste,
    applying said paste to a supporting member, and
    heat-treating said paste-applied supporting member firstly at the decomposition temperature of said viscous agent in an oxidization atmosphere and secondly at the melting point of said binder under vacuum or in an inert atmosphere.

2. A method of manufacturing positive electrodes for nonaqueous cells as set forth in claim 1, in which nylon or a fluoric resin selected from polytetrafluoroethylene resin, tetrafluoroethylene-ethylene copolymer or tetrafluoroethylene-hexafluoropropylene copolymer is used as a binder.

3. A method of manufacturing positive electrodes for nonaqueous cells as set forth in claim 1, in which polyvinyl alcohol or methyl cellulose is used as a viscous agent.

4. A method of manufacturing positive electrodes for nonaqueous cells as set forth in claim 1, in which nylon or a fluoric resin is used as a binder.

* * * * *